G. A. KERESTES.
MOVING PICTURE TARGET APPARATUS.
APPLICATION FILED NOV. 24, 1913. RENEWED JAN. 19, 1918.
1,281,169.
Patented Oct. 8, 1918.
2 SHEETS—SHEET 2.
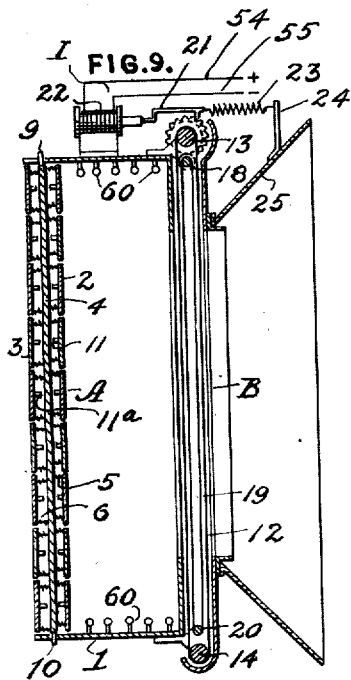
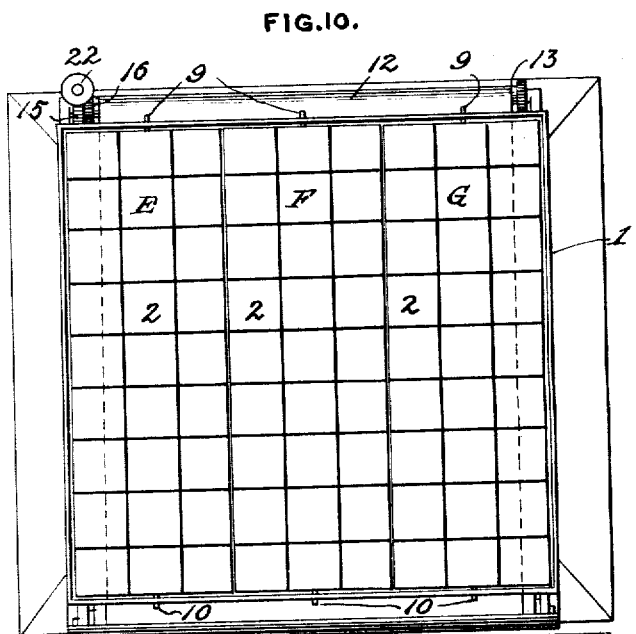
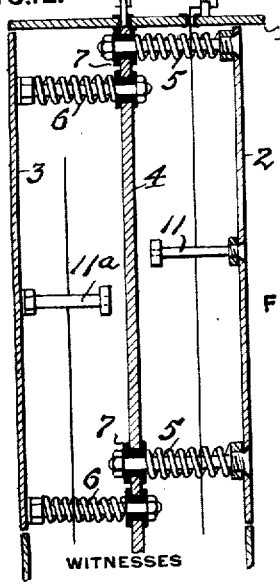
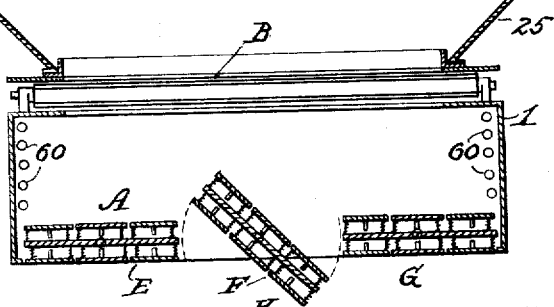
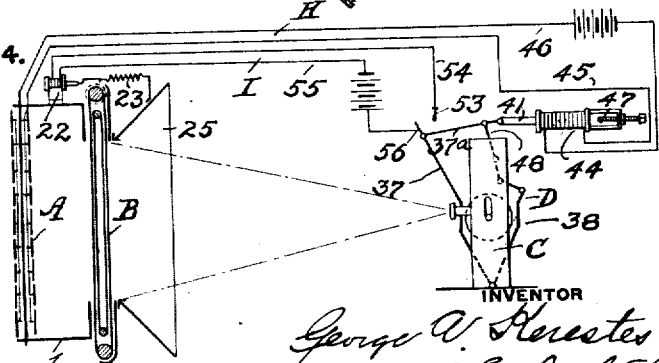
WITNESSES
F. E. Gaither
Lois Wineman
INVENTOR
George A. Kerestes
by W. G. Doolittle
Attorney

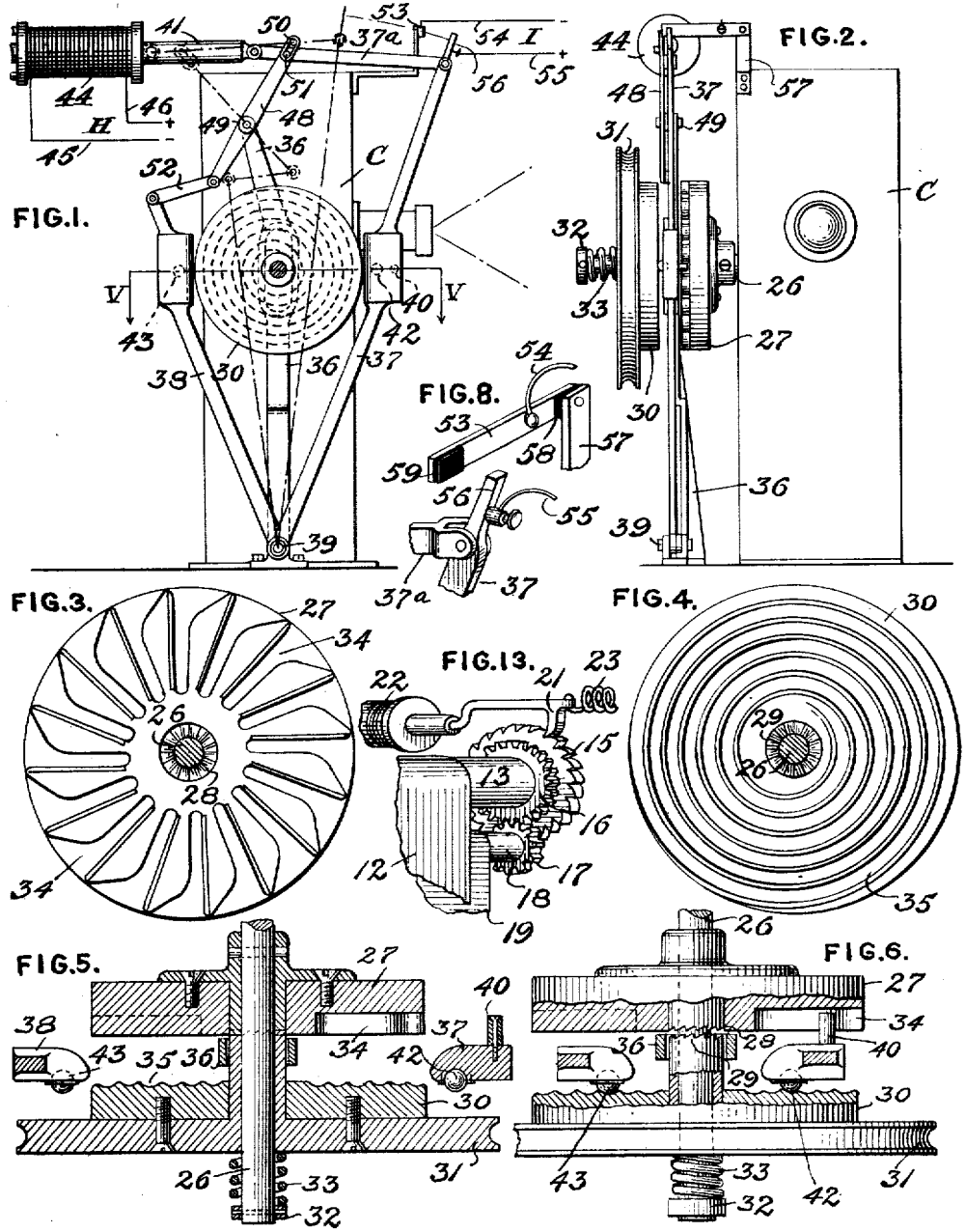

UNITED STATES PATENT OFFICE.

GEORGE A. KERESTES, OF PITTSBURGH, PENNSYLVANIA.

MOVING-PICTURE TARGET APPARATUS.

1,281,169. Specification of Letters Patent. Patented Oct. 8, 1918.

Application filed November 24, 1913, Serial No. 802,598. Renewed January 19, 1918. Serial No. 212,838.

*To all whom it may concern:*

Be it known that I, GEORGE A. KERESTES, a citizen of the United States, residing at Pittsburgh, in the county of Allegheny and State of Pennsylvania, have invented certain new and useful Improvements in Moving-Picture Target Apparatus, of which the following is a specification.

This invention relates to target apparatus used in connection with a cinematograph in which a moving picture is projected upon a perforatable screen in the rear of which is a source of illumination so that portion of the screen pierced by a bullet will be indicated by the light shining through.

One of the objects of the invention is to provide means whereby the force of the impact of the projectile will instantaneously arrest or stop the picture machine so that the picture object remains stationary on the screen and the point at which it was punctured may be observed.

It is also the purpose of this invention to temporarily stop the picture machine for a period long enough to permit the punctured picture to be observed. The invention further contemplates the inclusion of means to automatically start the picture machine after a determined interval of time.

Other objects and advantages of this invention will be specifically referred to hereinafter, it being understood that changes in form, proportion, and minor details of construction may be resorted to without departing from the spirit of this invention or sacrificing any of its advantages.

In the drawings:

Figure 1 is an elevational view of the starting and stopping mechanism for the picture machine;

Fig. 2 is an edge view thereof;

Fig. 3 is a face view of one of the clutch members for the starting and stopping mechanism;

Fig. 4 is a similar view of a complementary clutch member;

Fig. 5 is a sectional view through the two clutch members shown in Figs. 3 and 4, a portion of the drive shaft for the picture machine, and the clutch release members being shown;

Fig. 6 is a view of the elements shown in Fig. 5, parts being in section and parts in elevation;

Fig. 7 is a sectional view through one of the solenoids;

Fig. 8 is a detail view of two electrical contacts;

Fig. 9 is a vertical sectional view through the target;

Fig. 10 is a front view of the target;

Fig. 11 is a transverse sectional view through the target, one of the sectional parts being swung out of its normal position;

Fig. 12 is an enlarged fragmentary sectional view of part of the target;

Fig. 13 is a detail view of the screen actuating mechanism; and

Fig. 14 is a diagrammatical view of the target picture machine and the electric circuits.

Referring now to the drawings, A designates the target and B the screen. C designates the projection apparatus and D the actuating mechanism therefor.

The target is shown as comprising a frame in the rear of which are a plurality of plates 2 and 3 resiliently connected to a partition plate 4 by spring carrying bolts or pins 5 and 6. The bolts 5 are shown secured to the plates 2 and passing through insulating bushings 7 in plate 4, while the bolts 6 are secured to the plates 3 and pass through insulating bushings in the plate 4.

The plates 3 and their appurtenances are duplicates of plates 2. By reference to Fig. 10, it will be seen that these plates are arranged in a plurality of groups. In the present instance, three groups are shown, these being designated E, F and G. Each group is pivoted at its respective ends in the frame 1 by pins 9 and 10 so that any or all the plate sections or groups may be swung in the pivots (see Fig. 11) to reverse the sections for examination or repair without preventing the use of the target, because when one face of the target back is out of use, the opposite face will be in position to permit operation.

By reference to Fig. 12, it will be seen that each plate carries a contact pin. Those on plates 2 are designated by the reference numeral 11, while those on the plates 3 are designated 11$^a$. These pins 11 and 11$^a$ are adapted to contact with the plate 4 when receiving sufficient impact so as to complete a circuit and affect the actuating means for the picture machine in a manner to be presently explained.

In front of the frame 1 and parallel with the target back are two traveling screens, here shown as endless belts, one within the other. The outer section designated by 12 is mounted upon two rollers 13 and 14 and on one of these is ratchet wheel 15 and a gear 16. The gear 16 meshes with a smaller gear 17 on the roller 18 adjacent to the roller 13 and around which the inner endless screen 19 passes. The roller 20 at the lower end of the frame 4 also serves as a support for the belt 19. Inasmuch as the ratchet wheel 15 is directly on the shaft or roller 13, the screen 12 will move at a different rate than the screen 19. The advantage of this is that the perforations made by the projectile in passing through the two screens will not remain in alinement when the screens are moved by the pawl 21 actuated by the solenoid coil 22 secured to the frame 1 and adapted to oppose the spring 23 interposed between and connected to the pawl 21 and the finger 24 on the hood 25 of the frame 1.

In the illustrated embodiment of my invention, the moving picture machine is prevented from operating by a clutch and electrically operated actuator responsive to the impact of a projectile propelled against one of the plates 2 or 3. The construction of actuator, clutch and driving means for the picture machine which I have selected for illustrative purposes is best shown in Figs. 1 to 7 both inclusive.

The driven shaft 26 of the machine C carries a clutch member 27 fast to the shaft and it is provided with a toothed face 28 adapted to engage a similar face 29 on the complementary clutch member 30 loose on the shaft 26 and which may or may not be a part of the drive pulley 31 to which it is secured. Interposed between an abutment or shoulder 32 on the shaft 26 and the pulley 31 is a spring 33 coiled around the shaft 26, the tendency of which is to maintain the members 27 and 30 in clutched engagement. The clutch member 27 is provided with a plurality of radial recesses 34 corresponding in number with the number of vibrations of the shutter per second (in the present case there are 16).

One face of the clutch member 30 is provided with a spiral groove 35 best shown in Fig. 4. Between the clutch members 27 and 30 is a standard 36 secured to a suitable base and constituting a support for the clutch actuator consisting of the levers 37 and 38 and their connections. The lever 37 is pivoted at 39 to the standard 36 and intermediate of its ends it is provided with a recess engaging finger 40 to engage in the recesses 34 in clutch member 27. Anti-friction devices 42 and 43 are carried by levers 37 and 38 respectively to engage the spiral groove 35.

44 is a solenoid suitably supported and in the circuit one conductor 45 being connected to a contact pin 11 and the other conductor 46 being connected to the contact plate 4 of the target. A detail view of the solenoid 44 is shown in Fig. 7 as consisting of a coil 45, a core 41, and an adjusting screw 47, whereby the reciprocating movement of the core may be limited.

The period of time the moving picture machine will remain inactive after the impact against the target will depend upon the initial unclutching positions of the levers 37 and 38, because should the balls 42 and 43 initially engage the groove 35 near the axis of the member 30, a longer period would elapse before the levers 37 and 38 moved to the periphery of the member 30 than would be required if the initial positions of the balls should be near the periphery of the member 30. Just what the initial position of the balls is to be may be determined by the adjustment of the screw 47 which limits the movement of the core 41 in the operating direction.

The core 41 of the solenoid 44 and the lever 37 are connected by a link 37$^a$. 48 is a lever pivoted intermediate its ends at 49 to the standard 36. One end of the lever 48 is provided with an elongated slot 50 engaged by a pin 51 on the link 37$^a$, and the other end of the lever 48 is connected to the lever 38 by a link 52. 53 is a laterally projecting spring arm having suitable electrical conductivity and connected to the conductor 54 of the circuit I, the conductor 55 of the circuit I being connected to the contact 56, in this instance, comprising part of the lever 37. The arm 53 is insulated from its supporting bracket 57 by the pad 58 and is provided on one side at the end with an insulating pad 59.

Any light source may be employed for the interior of the target, for example, the lamps 60.

Assuming all of the parts to be properly assembled, and the cinematograph to be operating so as to throw a moving picture upon the screen B, as soon as a projectile is propelled through the screen so as to strike one of the plates 2 or 3, as the case may be, the force of impact of the projectile will be sufficient to cause the contact pin 11 to move against the conductor plate 4 so as to close the circuit H. The closing of the circuit H will be effective in energizing the coil 44, and according to the diagram shown in Fig. 4, the core 41 will be moved from left to right so as to cause the levers 37 and 38 to be moved toward each other between the clutch members 27 and 30.

As soon as the levers 37 and 38 are moved toward each other, the finger 40 on the lever 37 will be caused to engage a recess 34 and at the same time, the anti-friction devices 42 and 43 which ride over the edge of clutch member 30 will force the clutch member 30 away from the clutch member 27 so as to move it out of clutch position and permit the drive pulley 31 and the clutch member 30 to continue their rotation without rotating the shaft 26.

As the core 41 is moved from left to right, the contact 56 is caused to wipe the spring arm 53, but inasmuch as that portion of the arm which comes in contact with the arm 53 is insulated, the circuit H is not closed, therefore, there is no action of the solenoid 22.

The period of time during which the moving picture machine is arrested or stopped depends upon the period of time necessary for the anti-friction devices 42 and 43 to move from the positions to which they were brought by the solenoid 44 to the periphery of the clutch member 30, the tendency being for the continued rotation of the pulley 31 and the clutch member 30 to force the anti-friction devices 42 and 43 in the spiral slot 35 toward the perimeter of the clutch member 30. The period of time necessary to move these levers beyond the perimeter of the clutch member 30 will be sufficient to permit observation to be made of the picture on the screen B to determine the point at which the perforation was effected. Just as soon as the clutch actuating levers are moved out of contact with the clutch member 30, the finger 40 will have moved out of contact with recess 34 in the clutch member 27, and the spring 33 will have forced the two clutch faces 28 and 29 together so that the shaft 26 will begin to rotate and, of course, the moving picture machine will begin to operate.

The outward movement of the lever 37 will cause a return movement of the contact finger 56, and on its return movement, it will contact with the arm 53 so as to close the circuit I. The closing of the circuit I will be effective in energizing the solenoid 22 so as to cause the core of the solenoid to oppose the spring 23 with sufficient force to permit the pawl 21 to move the ratchet 15 to impart a partial revolution to the roller 13.

As heretofore explained, the ratio between the gears 15, 16 and 17 is such that the two endless belts move at different speeds, so it will be apparent that a slight rotation of the roller 13 will be effective in obliterating the puncture through the two screens which had previously been made by the projectile.

What I claim is:—

1. In target apparatus for use with cinematographs and the like and in combination, a picture projecting device, a target screen on to which the picture is projected, and means for arresting the movement of the device during a predetermined period and automatically continuing such movement upon the completion of said period, said means including a normally inactive electric circuit rendered active by the force of impact of a projectile, and mechanism controlled by said circuit and operative within the drive connections of said device substantially concurrently with such predetermined period for effecting the arresting operations.

2. In target apparatus for use with cinematographs and the like and in combination, a picture projecting device, a target screen on to which the picture is projected, and means for arresting the movement of the device during a predetermined period, said means including a normally inactive electric circuit rendered active by the force of impact of a projectile, and mechanism controlled by said circuit and operative within the drive connections of said device for effecting the arresting operation, said mechanism being variable at will to control the length of such arresting action.

3. In a target apparatus for use with cinematographs and the like and in combination, a picture projecting device, a target screen on to which the picture is projected, and means for arresting the movements of said device during a predetermined period and automatically continuing such movement upon the completion of said period, said means including a normally-inactive electric circuit, mechanism controlled by said circuit and operating in the driving connections of the device substantially concurrently with such predetermined period for effecting disengagement of the drive connections for said device, and means rendered active by the impact of a projectile for closing said circuit.

4. In a target apparatus for use with cinematographs and the like and in combination, a picture projecting device, a target screen on to which the picture is projected, and means for arresting the movements of said device during a predetermined period and automatically continuing such movement upon the completion of said period, said means including a normally inactive electric circuit, mechanism controlled by said circuit and operating in the driving connections of the device substantially concurrently with such predetermined period for effecting disengagement of the drive connections for said device, and means rendered active by the impact of a projectile for closing said circuit, said mechanism remaining active upon breaking of said circuit.

5. In a target apparatus for use with cinematographs and the like and in combination, a picture projecting device, a target screen on to which the picture is projected, and means for arresting the movements of said device during a predetermined period, said means including a normally inactive electric circuit, mechanism controlled by said circuit and operating in the driving connections of the device for effecting disengagement of the drive connections for said device, and means rendered active by the impact of a projectile for closing said circuit, said mechanism remaining active upon breaking of said circuit, the control of the active period of said mechanism being provided by the drive connections.

6. In target apparatus for use with cinematographs, the combination with a picture projecting device, a target screen comprising a plurality of endless belts movable at different speeds, and means responsive to the force of impact for arresting the picture projecting apparatus and for moving the endless belts.

7. In target apparatus for use with cinematographs, the combination with a picture projecting device, a target screen comprising two parallel sheets, and means for simultaneously moving said sheets at different relative speeds.

8. In target apparatus for use with cinematographs and the like and in combination, a picture projecting apparatus, a target screen, disengageable drive connections for the projecting apparatus, a normally inactive electric circuit, mechanical means for disengaging said drive connections when said circuit is closed, means including an independent electrical circuit for actuating said screen step by step, and a make and break device for said latter circuit, said device being controlled by the movements of the mechanical means and operative to close its circuit at a predetermined period in the operations of said mechanical means.

9. In target apparatus for use with cinematographs, the combination with a picture projecting apparatus, a target screen, a moving picture projecting device to project a picture on the screen, a constantly operating driving means, a driven means for the picture machine, means for clutching the driving means to the driven means, means responsive to the force of impact of a projectile to disconnect the driving means from the driven means, and means on the driving means for restoring the clutching engagement between the driving means and the driven means.

10. In a moving picture projecting apparatus, a driving clutch, a driven clutch member, means for releasing the driven clutch member comprising a device having movement to separate said clutch members, and means on one of the clutch members to be engaged by a part on said means to render said means inoperative.

11. In a moving picture projecting apparatus, a driving member, a driven member, means for clutching said members together, an unclutching mechanism comprising members having movement to oppose the clutching means, and means on one of the clutch members to render said unclutching mechanism inoperative.

12. In a moving picture projecting apparatus, a driving member, a driven member, means for clutching said members together, and an unclutching mechanism comprising members having movement to oppose the clutching means, and electrically operated means to actuate the unclutching mechanism.

13. A target screen comprising two endless belts one within the other, and means responsive to the force of impact of a projectile for simultaneously moving said screens at relatively different speeds.

14. In target apparatus for use with cinematographs and the like and in combination, a picture projecting apparatus, a target screen on which the picture is projected, and means for arresting the movement of the projecting apparatus during a predetermined period of time, said means including disengageable drive connections for the projecting apparatus, mechanical means for providing such disengaging action, a normally inactive electrical circuit, means rendered active by the closing of said circuit for rendering said mechanical means active, the length of activity of said mechanical means being controlled independent of said circuit.

15. In a moving picture projecting apparatus, a constantly operating driving member, a driven member, means for normally connecting the driven member to the driving member, a clutch separator engaged by the driving member, a determined period of time after each separation, and means for varying the determined period of time the clutch members will remain separated.

16. In a moving picture projecting apparatus, a constantly operating driving member, a driven member, a normally clutched connection between them, ribs on the driven member forming a spiral groove, a clutch separator comprising a lever movable between the driving member and the driven member, and a rotating member on the lever to engage the groove when the driving member and the driven member are separated so as to cause the lever to move out of separating position.

17. In a moving picture projecting apparatus, a driving member having a clutch portion and a driven member having a clutch portion, the driving member having a spiral groove, an electrically operated clutch separator movable between the driving member and the driven member to separate them, and means on the clutch separator to engage the spiral groove whereby the rotation of the driving member will move the clutch separator out of separating position.

18. In a moving picture projecting apparatus, a driving member having a clutch portion and a driven member having a clutch portion, the driving member having a spiral groove, an electrically operated clutch separator movable between the driving member and the driven member to separate them, means on the clutch separator to engage the spiral groove whereby the rotation of the driving member will move the clutch separator out of separating position, and variable means for determining the initial separating position of the separator.

19. In target apparatus for use with cinematographs and the like and in combination, a picture projecting apparatus, a target screen on which the picture is projected, and means for arresting the movements of the projecting apparatus during a predetermined period of time, said means including disengageable drive connections for the projecting apparatus, mechanical means for providing such disengaging action, a normally inactive electrical circuit, means rendered active by the closing of said circuit for rendering said mechanical means active, the length of activity of said mechanical means being controlled independent of said circuit, and adjustable means for varying the length of movements of said mechanical means, whereby the length of arresting action may be varied at will.

20. In target apparatus for use with cinematographs and the like, and in combination, a picture projecting apparatus, a target screen on which the picture is projected, and means for arresting the movement of the projecting apparatus during a predetermined period of time, said means including disengageable drive connections for the projecting apparatus, mechanical means for providing such disengaging action, a normally inactive electrical circuit, means rendered active by the closing of said circuit for rendering said mechanical means active, the length of activity of said mechanical means being controlled independent of said circuit, said circuit being broken in advance of the completion of the arresting period, said mechanical means coöperating with the driving connections in completing this period after breaking of the circuit.

21. In target apparatus for use with cinematographs and the like and in combination, a picture projecting device, a target screen on to which the picture is projected, and means for arresting the movement of the device during a predetermined period and automatically continuing such movement upon the completion of said period, said means including a normally inactive electric circuit having an interruption, means responsive to the operations of the projectile-moving device for temporarily closing said interruption to render said circuit active, and mechanism controlled by said circuit and operative within the drive connections of said device substantially concurrently with such predetermined period for effecting the arresting operation.

22. In target apparatus for use with cinematographs and the like and in combination, a picture projecting device, a target screen on to which the picture is projected, and means for arresting the movement of the device during a predetermined period and automatically continuing such movement upon the completion of said period, said means including a normally inactive electric circuit rendered active by the force of impact of a projectile, and mechanism controlled by said circuit and operative upon the drive connections of said device substantially concurrently with such predetermined period, for effecting the arresting operation.

23. In target apparatus for use with cinematographs and the like and in combination, a picture projecting device, a target screen on to which the picture is projected, and means for arresting the movement of the device during a predetermined period and automatically continuing such movement upon the completion of said period, said means including a normally inactive electric circuit having an interruption, means responsive to the operations of the projectile-moving device for temporarily closing said interruption to render said circuit active, and mechanism controlled by said circuit and operative upon the drive connections of said device substantially concurrently with such predetermined period for effecting the arresting operation.

In testimony whereof I affix my signature in presence of two witnesses.

GEORGE A. KERESTES. [L. S.]

Witnesses:
W. G. DOOLITTLE,
F. E. GAITHER.